(12) United States Patent
Cavacuiti et al.

(10) Patent No.: US 8,502,781 B2
(45) Date of Patent: Aug. 6, 2013

(54) 3-AXIS TRACKBALL

(75) Inventors: John L. Cavacuiti, North Vancouver (CA); Benjamin Roberts, White Rock (CA); Donald Randall Logan, Mile Ranch (CA); John Hung, Vancouver (CA)

(73) Assignee: ACCO Brands Corporation, Lake Zurich, IL (US)

( * ) Notice: Subject to any disclaimer, the term of this patent is extended or adjusted under 35 U.S.C. 154(b) by 187 days.

(21) Appl. No.: 12/922,847

(22) PCT Filed: Mar. 18, 2009

(86) PCT No.: PCT/US2009/037537
§ 371 (c)(1),
(2), (4) Date: May 27, 2011

(87) PCT Pub. No.: WO2009/117503
PCT Pub. Date: Sep. 24, 2009

(65) Prior Publication Data
US 2011/0221677 A1    Sep. 15, 2011

Related U.S. Application Data
(60) Provisional application No. 61/038,305, filed on Mar. 20, 2008.

(51) Int. Cl.
*G06F 3/033* (2006.01)
(52) U.S. Cl.
USPC .......................................... 345/167; 345/164

(58) Field of Classification Search
USPC ................. 345/153, 163, 164, 166, 167, 184, 345/15; 250/221
See application file for complete search history.

(56) References Cited

U.S. PATENT DOCUMENTS
4,767,923 A * 8/1988 Yuasa ........................... 250/221
4,933,670 A   6/1990 Wislocki
(Continued)

FOREIGN PATENT DOCUMENTS
JP    6-97430        11/1994
JP    7-49743 A       2/1995
(Continued)

OTHER PUBLICATIONS
International Search Report dated Jul. 31, 2009, issued in related International Patent Application No. PCT/US2009/037537, filed Mar. 18, 2009.
(Continued)

*Primary Examiner* — Joe H Cheng
(74) *Attorney, Agent, or Firm* — Michael Best & Friedrich LLP

(57) ABSTRACT

An input device is disclosed. The input device can provide a control signal to a host system. The input device can include a ball and one or more sensor assemblies configured to sense the position of the ball. The input device can sense movement both in the X-Y motion of the ball, and the spin of the ball. Different control signals may be sent to a host system based upon the X-Y motion and the spin of the ball.

20 Claims, 13 Drawing Sheets

U.S. PATENT DOCUMENTS

| | | | |
|---|---|---|---|
| 5,355,146 A * | 10/1994 | Chiu et al. | 345/156 |
| 6,200,219 B1 * | 3/2001 | Rudell et al. | 463/37 |
| RE37,878 E * | 10/2002 | Bidiville et al. | 345/165 |
| 6,525,714 B1 | 2/2003 | Varga et al. | |
| 6,586,720 B2 | 7/2003 | Hu | |
| 8,314,773 B2 * | 11/2012 | Low et al. | 345/166 |
| 2001/0041607 A1 * | 11/2001 | Adamczyk et al. | 463/2 |
| 2002/0118173 A1 * | 8/2002 | Nacson | 345/163 |
| 2004/0051695 A1 | 3/2004 | Yamamoto et al. | |
| 2006/0274042 A1 * | 12/2006 | Krah et al. | 345/163 |
| 2010/0060234 A1 * | 3/2010 | Nacson | 320/114 |
| 2010/0134414 A1 * | 6/2010 | Cavacuiti | 345/158 |

FOREIGN PATENT DOCUMENTS

| | | |
|---|---|---|
| JP | 10207629 | 8/1998 |
| JP | 3176347 | 6/2001 |
| JP | 2004-62308 | 2/2004 |
| KR | 10-2007-0047659 | 5/2007 |
| TW | 371502 Y | 10/1999 |
| TW | 486121 Y | 5/2002 |

OTHER PUBLICATIONS

Translation of Japanese Office Action for Japanese Patent Appl. No. 2011-500928, dated Mar. 22, 2013, 2 pages.

* cited by examiner

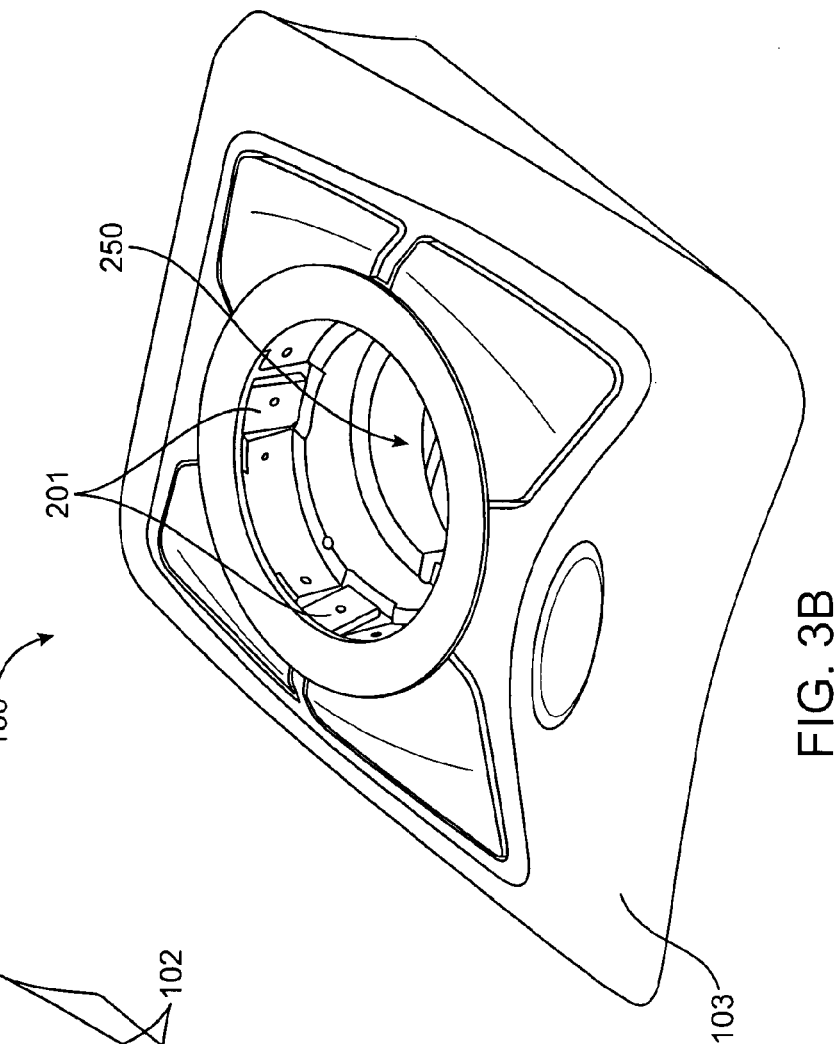
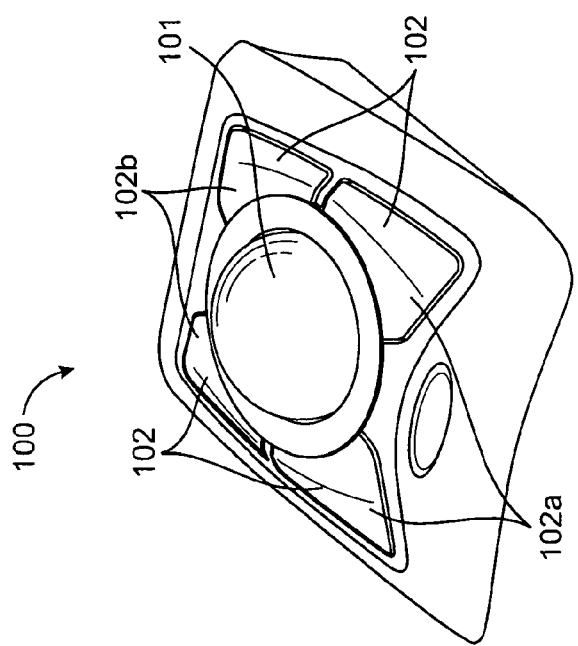
FIG. 3B
FIG. 3A

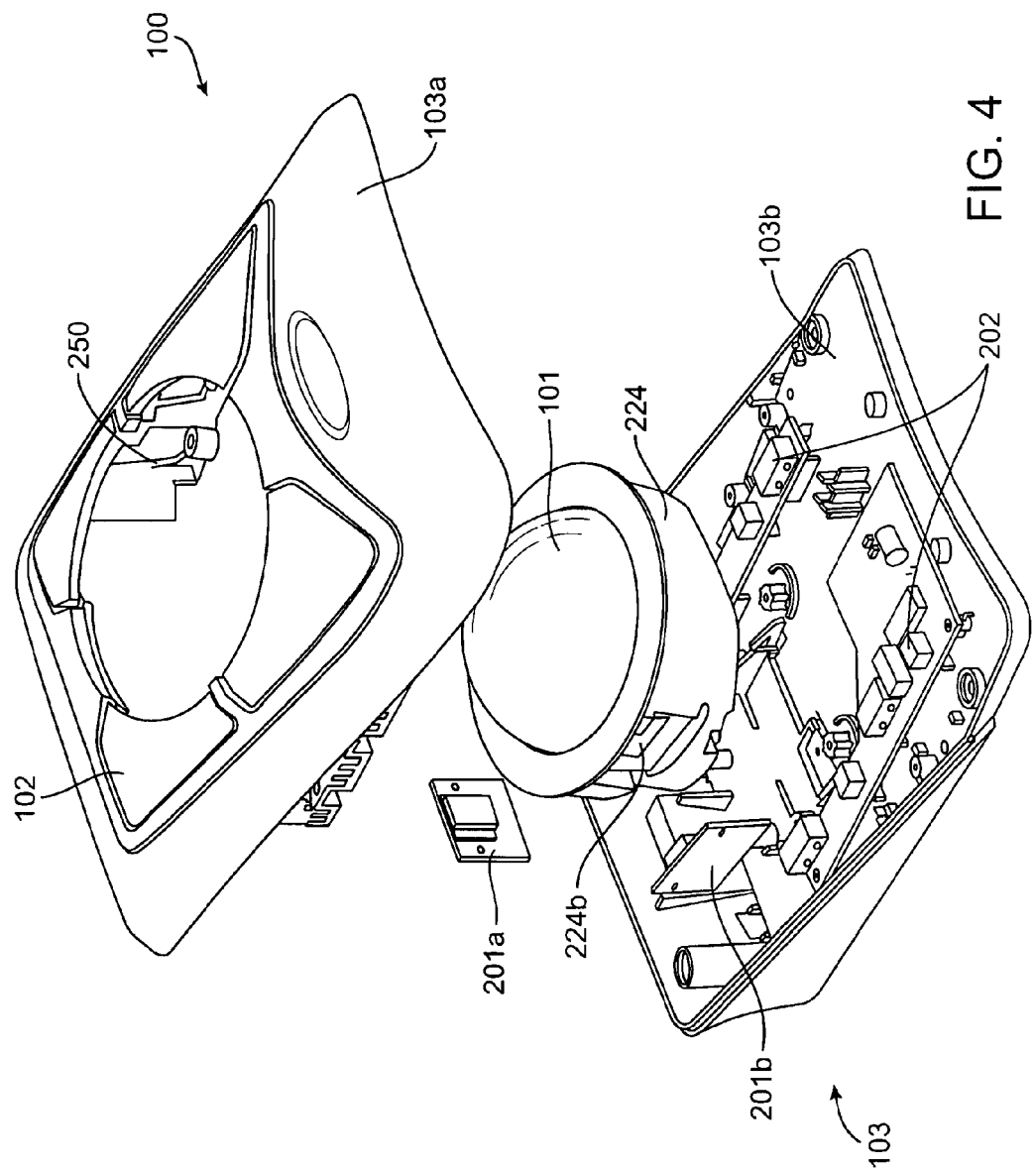

3-AXIS TRACKBALL

CROSS-REFERENCES TO RELATED APPLICATIONS

This patent application is a U.S. national stage entry of international application no. PCT/US2009/037537, filed Mar. 18, 2009, which is a non-provisional of and claims the benefit of the filing date of the U.S. provisional patent application No. 61/038,305 filed on Mar. 20, 2008 which are herein incorporated by reference in their entirety for all purposes.

BACKGROUND

Trackball devices are known. Trackball devices can be a common method of controlling a computer or other electronic devices. Such trackball devices can include a controller ball and several buttons. Often, a great number of buttons are required to control various aspects of the host system. A large button layout can be intimidating to certain users, especially novice users. Furthermore, the function of each button must be memorized by the user. Such a set up may not be intuitive to a user or economical to produce.

Embodiments of the invention address the above problems and other problems, individually and collectively.

BRIEF SUMMARY

Embodiments described herein are directed to improved input devices for use with host systems such as host computer devices.

One embodiment is directed to an input device. The input device comprises a ball, a sensor assembly configured to sense the position of the ball, and a controller operatively coupled with the sensor, wherein the controller is configured to determine both an X-Y motion of the ball and a spin of the ball, using the sensor assembly.

Another embodiment is directed to an input device for providing a control signal to a host system, the input device comprising a ball, a first sensor assembly configured to sense the position of the ball, a second sensor assembly configured to sense the position of the ball, and a controller operatively coupled with the first sensor assembly and the second sensor assembly, wherein the controller is set to a first mode when both the first sensor assembly and the second sensor assembly detect spin, and the controller is set to a second mode when at least one of the first sensor assembly and the second sensor assembly do not detect spin.

Another embodiment is directed to a method of controlling a host system using an input device including a ball, the method comprising moving the ball in a first rotation to send a first type of control signal to the host system, and moving the ball in a second rotation to send a second type of control signal to the host system.

These and other embodiments of the invention are described in further detail below.

BRIEF DESCRIPTION OF THE DRAWINGS

FIGS. 3A-3B show perspective views of an embodiment of an input device.

FIG. 4 shows an exploded view of some components of an embodiment of an input device.

DETAILED DESCRIPTION

An input device is disclosed. The input device is configured to provide a control signal to a host system. It includes a ball, and at least one sensor assembly configured to sense the position of the ball. A user may manipulate the ball (such as by hand) to send control signal(s) to the host system. The device is configured to determine both the X-Y motion of the ball and the spin of the ball using the sensor assembly. Exemplary embodiments described herein include two sensor assemblies to sense the X-Y motion and spin. The two sensor assemblies can be located at or near the equator of the ball.

As used herein, "X-Y motion" can be the lateral, forward, and backward rotation of a ball in an input device. For example, from a user's point of view of looking down on the ball, the top-most point of the ball may move left, right, forward, and backwards (or any combination of these directions), during X-Y motion. In certain embodiments, the X-Y motion of the ball can correspond to the motion of a cursor on a display screen of a host system, such as a personal computer, that is connected to the input device. The direction and distance traveled by the cursor can be proportional to the rotation of the ball. X-Y motion can also refer to other functions performed by the motion of the ball, such as panning a photo displayed on the host system.

"Spin", as used herein, can refer to the twisting of the ball about a vertical or approximately vertical axis. This twisting can result in clockwise or counterclockwise rotation of the ball about the vertical axis. For example, from a user's point of view of looking down on the ball, the topmost point of the ball may have limited or no movement, during spin motion. In one aspect, the top-most point of the ball may only spin in place during spin motion. The spin of the ball can be used to control an element of the host system. These elements need not be related to the X-Y motion of a cursor. For example, spin of the ball can be used for volume control, zooming in and out of a display on the host system, scrolling a window displayed on the host system, etc. Such spin will be described in greater detail below.

Embodiments described herein have a number of advantages. The sensors may be located at or near the equator of the ball, so that the height of the device may be reduced. The lower the height of the ball on the input device, the more ergonomic the device may be, and the greater the design possibilities. As noted above, the spin of the ball can be determined. This allows for greater functionality from the ball, as the single input device can control multiple functions on the computer without adding extra buttons. Such a design allows for the various controls required by certain applications, without intimidating more novice users.

Figure 1:
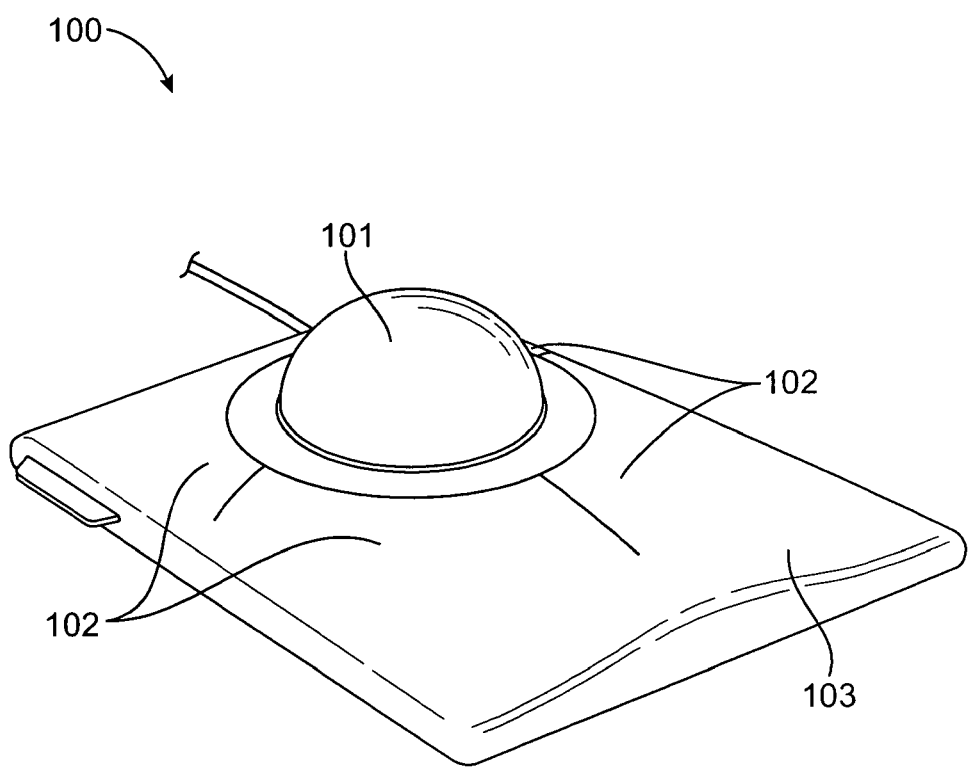
FIG. 1 shows a perspective view of an embodiment of input device.

FIG. 1 shows a perspective view of an input device 100, such as a trackball system, according to an embodiment. The input device 100 comprises a housing 103. Coupled to the housing is a plurality of buttons 102. The buttons can be configured to provide a variety of instructions to a host system, such as opening certain programs or emulating keyboard inputs. Also rotatably coupled with the housing 103 is a ball 101, which is disposed within the housing. In certain embodiments, at least 50% (half) of the surface of the ball can extend above the housing 103, to allow for easier access to a user. Ball 101 can spin, as shown in FIG. 2A. Arrows 105 show the direction of the spin that can be determined. Ball 101 can spin in both the clockwise and counterclockwise direction.

Figure 2B:
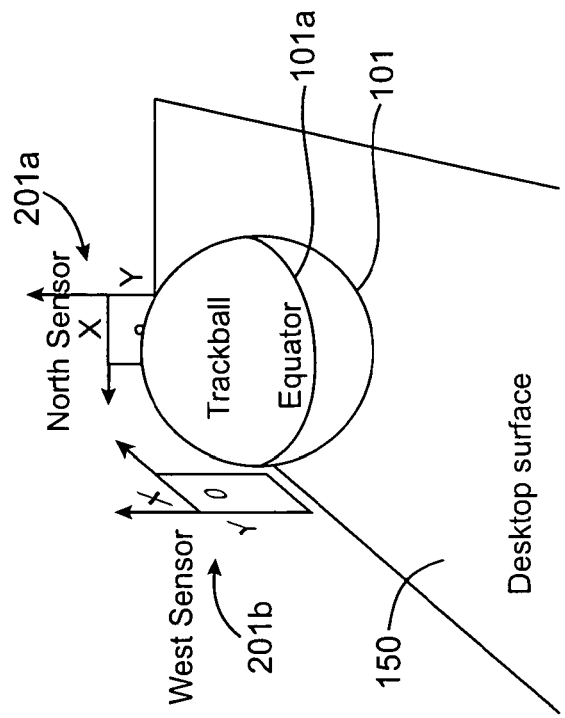
FIGS. 2A-2B show spin and sensor placement of an embodiment of an input device.
Figure 2A:
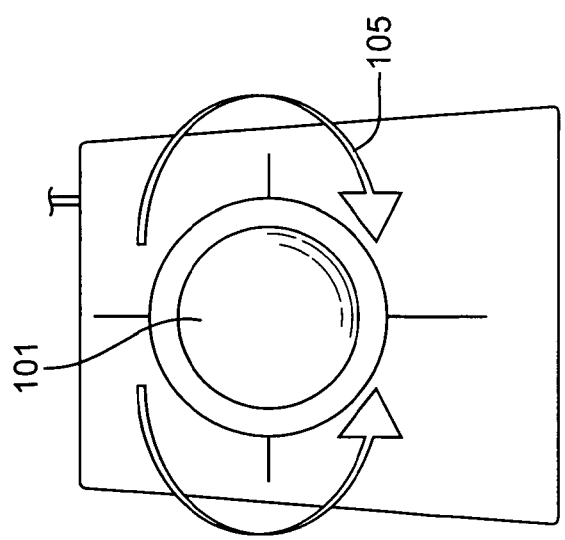

FIG. 2B shows a perspective view that highlights the sensor assemblies according to an embodiment. In FIG. 2B, the housing and related electronics for the input device are not shown, to better detail the placement of the sensor assemblies in relation to the ball. The system is placed on a surface 150, such as a desktop. Embodiments are not confined to use on a desktop however, and may be used while held in a user's hand, on a user's lap, or other locations known to those skilled in the art. Ball 101 is suspended above the surface 150 by a housing (not shown). Two sensor assemblies are shown, a west sensor assembly 201b and a north sensor assembly 201a. Exemplary embodiments can encompass other sensor assembly configurations, such as a single sensor assembly between the ball and the surface, three sensor assemblies arrayed around the ball, etc.

Embodiments described herein may refer to certain terminology and conventions with regard to the ball 101 and spin. Equator 101a comprises a diameter of ball 101, and can be approximately parallel to surface 150. As used herein, "approximately parallel" can refer to plus or minus about 15 degrees from parallel (e.g, the equator may form up to about ±15° angle with a plane parallel to surface 150), such as 10 degrees. Certain embodiments contemplated herein can use equators having a greater deviation from parallel than about 15 degrees, such as 30, 25, or 20 degrees. Ball 101 can have a north/south axis (the north end pointing towards north sensor assembly 201a), and a west/east axis (the west end pointing towards west sensor assembly 201b). For each sensor assembly, the Y-direction can point away from the equator 101a (e.g. approximately perpendicular to the equator), while the X-direction can run approximately parallel to the equator 101a (i.e., the diameter). Sensor assembly 201b may be spaced approximately 90 degrees apart from sensor assembly 201a, with both sensors located at or near the equator 101a. Exemplary embodiments can comprise sensors at other locations relative to the ball and each other, such as having each sensor be 45 degrees apart. In certain embodiments, the sensor assemblies may be located approximately at or below the equator 101a. As used herein, "approximately at or below the equator" may refer to a location within plus 10 (10° above) to minus 20 (20° below) the equator. For example, the sensor assemblies may be located 15-20 degrees below the equator 101a, such as 17 degrees below the equator. Exemplary embodiments can comprise sensors at other locations relative to the ball and each other, such as having each sensor be 25 degrees below the equator, 15 degrees above the equator, etc.

In one embodiment, a spin of the ball 101 occurs when ball 101 rotates about an axis running through the center of the ball in the Y-direction (a vertical axis). This vertical axis can be approximately perpendicular to work surface 150, such as forming a 75 or 80 degree angle therein. During spin of the ball 101, the vertical axis can remain approximately perpendicular to the work surface 150 (i.e., the angle with the work surface may not significantly vary). In contrast, during X-Y motion, the axis may not remain approximately perpendicular to the work surface 150. In one aspect, spin can comprise a rotation about the equator of ball 101. An example of spin can be shown by arrows 105 in FIG. 2A, and can comprise a clockwise or counterclockwise rotation of the ball 101. Spin can be determined by comparing the readings of sensor assembly 201a with the readings of sensor assembly 201b. If both sensor 201a and 201b detect movement in the X-direction but limited or no movement of ball 101 in the Y-direction, spin is occurring. If either or both sensors 201a and 201b detect movement of ball 101 in the Y-direction, then there is no spin occurring. The X-Y motion of ball 101 can also be determined by the sensor assemblies 201a and 201b. For example, if one or both sensor assemblies detect greater than limited movement of ball 101 in the Y-direction, then there can be X-Y motion, which can be translated by a controller (such as located in the device or in a host system) into cursor movement on a display screen, or other types of output.

As used herein, "limited" movement can be a threshold set by a user or manufacturer to optimize the user experience of the input device. For example, in certain embodiments limited movement in the Y-direction may comprise any movement that is less than the currently detected motion in the X-direction, for a specific sensor assembly. In other embodiments, limited movement may comprise movement of less than a specified distance or speed of rotation. Thus, the input device can account for "wobbles" or other unintentional movement in the Y-direction. This in turn can allow a user's intended instructions (spin, X-Y motion, etc.) to be more easily conveyed, improving the user's ability to control a host system.

FIGS. 3A and 3B show a perspective view of an embodiment of a trackball system 100. A plurality of buttons 102 may be disposed in the housing 103. In certain embodiments, the plurality of buttons 102 may comprise four buttons, and each button may have a separate function. For example, the two lower buttons 102a may be used to select items on a display screen of a host system (and may correspond to left and right mouse buttons). The two upper buttons 102b may be used to change the settings of the input device, such as to allow the input device to control music or images. In other embodiments, the buttons in the plurality of buttons 102 may comprise different functions as is known to one skilled in the art. Housing 103 is coupled to a ball 101. Ball 101 can be maintained in a rotatable position by residing in aperture 250. As such, the ball may be rotated by a user's hand. Sensor assemblies 201 can be disposed within the aperture 250. As in FIG. 2B, the sensor assemblies are spaced approximately 90 degrees apart from each other. In other embodiments, the sensor assemblies 201 may be spaced more or less than 90 degrees apart, such as 80 degrees, 45 degrees, etc. In exemplary embodiments, sensor assemblies 201 are located approximately at or below the equator of ball 101. More specifically, the sensor assemblies 201 are located approximately 17 degrees below the equator of ball 101 in the embodiment shown in FIG. 3B. This has the advantages of allowing more the surface area of ball 101 to be exposed to the user, increasing usability and comfort, without impinging on the sensor assemblies' ability to track the motion of ball 101. Embodiments contemplate locating the sensor assemblies 201 at other positions.

FIG. 4 shows an exploded view of some components of an embodiment of an input device 100. The housing 103 of system 100 may be formed from one or more housing components, including an upper housing portion 103a and a lower housing portion 103b. Although the housing 103 is shown as being formed from separate housing portions 103a, 103b, it may be formed from more or less housing portions in other embodiments. The upper housing 103a may include buttons 102, and an aperture 250. Ball 101 can extend outside of aperture 250, allowing for rotation by a user. Bezel 224 can hold ball 101, while still allowing for full rotation of the ball. Bezel 224 may comprise Teflon, plastic, metal, or other suitable material as is known in the art. In certain implementations, one or both of the ball 101 and bezel 224 may be coated with a lubricant, such as lanolin, to allow for smooth ball movement. Bearings, preferably of a high density material, can be disposed between bezel 224 and ball 101 to reduce friction during rotation.

Bezel 224 can have apertures for placement of sensor assemblies 201a and 201b. Aperture 224b can couple with sensor assembly 201b, and another aperture (not shown) can couple with sensor assembly 201a. Sensor assembly 201a and sensor assembly 201b can comprise optical sensor assemblies. The first and second optical assemblies 201a, 201b may comprise a laser, LED or other illumination device. Operatively coupled with the sensor assemblies 201a and 201b can be a printed circuit board 202 including a controller. Controller 202 can include a processor and a memory unit, and may be loaded with firmware. The firmware may be used to determine spin or X-Y motion of ball 101, to determine activation of any of buttons 102, to communicate with a host system, and to perform other input device functions as is known in the art. An RF module may also be present in the housing and may be coupled to the printed circuit board 202. The RF module may comprise an antenna (not shown) which allows the input device 100 to communicate with a host system (not shown).

Figure 5:
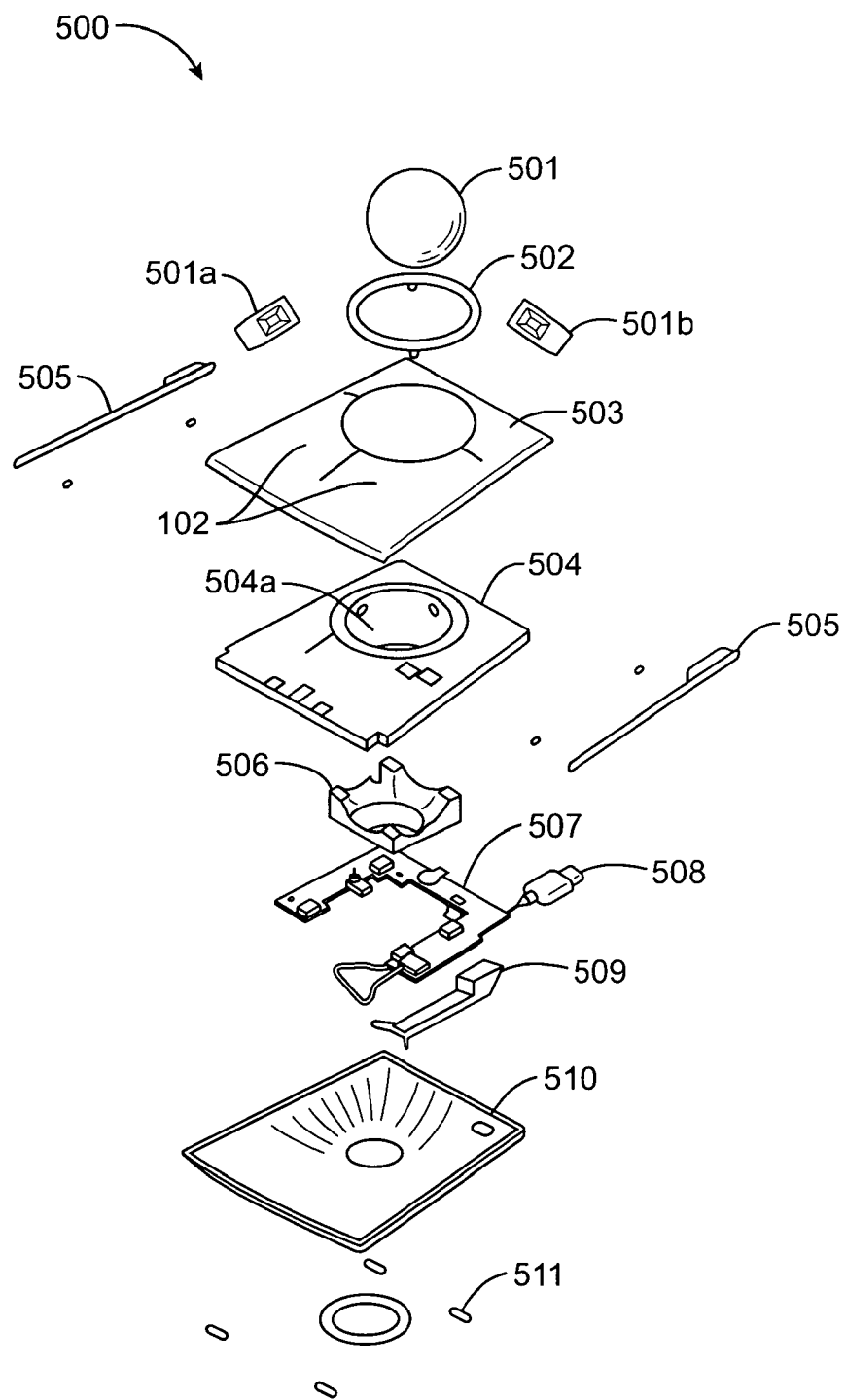
FIG. 5 shows an exploded view of some components of an embodiment of an input device.

FIG. 5 shows an exploded view of some components of another embodiment of input device 500. The housing of system 500 may be formed from one or more housing components, including top case 503 and a bottom case 510. Although the housing is shown as being formed from separate housing components 503, 510, it may be formed from more or less housing components in other embodiments. The top case 503 may include buttons 102, and may comprise plastic or other suitable material. In some implementations, the plurality of buttons 102 may be formed as portions of top case 503. The material comprising top case 503 may be deformable such that a user can depress the buttons 102 without breaking the buttons or the housing. Finger ring 502 may surround ball 502. Finger ring 502 may comprise any suitable material such as plastic or aluminum, and may be plated, textured, or polished. Rubber feet 511 may be used to protect the input device 501 from scratches and other contact. The side rubber panels 505 may be used to couple input device 500 to other compatible devices, such as keyboards or desktop sets.

Inner case 504 can hold ball 501, while still allowing for full rotation of the ball. Inner case 504 may include a ball chassis 504a, which is curved to fit the shape of ball 501. In certain implementations, the bottom of ball chassis 504a and lower case 510 may each comprise a lower aperture, such that ball 501 can be visible from below input device 500. The lower apertures may be smaller than the diameter of ball 501, to prevent ball 501 from falling through the input device 500. Ball 501 may comprise any suitable ball, such as a 55 mm diameter trackball. Inner case 504 may comprise Teflon, plastic, metal, or other suitable material as is known in the art. In certain implementations, one or both of the ball 501 and inner case 504 may be coated with a lubricant, such as lanolin, to allow for smooth ball movement. Bearings, preferably of a high density material, can be disposed between inner case 504 and ball 501 to provide for less friction during rotation. For example, there may be three separate bearings made of ruby or stainless steel. The bearings may each have any suitable size, such as a diameter of 2 mm. A dampener, such as rubber dampener 506, may be disposed between inner case 504 and bottom case 510. The rubber dampener 506 may be used to absorb vibrations from nearby equipment (such as computers, fans, etc.), so that ball 501 does not unduly vibrate. Rubber dampener may also be used to absorb pressure exerted by a user, preventing stress and wear in the components of input device 500.

Inner case 504 can have apertures for placement of sensor assemblies 501a and 501b. Sensor assemblies 501a and 501b may comprise sensors and printed circuit boards including sensor circuitry. Sensor assembly 501a and sensor assembly 501b can comprise optical sensor assemblies as described in more detail below. Operatively coupled with the sensor assemblies 501a and 501b can be a printed circuit board (PCB) 507 including a controller. The controller on PCB 507 can include a processor and a memory unit, and may be loaded with firmware. The firmware may be used to determine spin or X-Y motion of ball 501, to determine activation of any of buttons 102, to communicate with a host system, and to perform other input device (such as a trackball) functions as is known in the art. PCB 507 may couple to a cable guide 509, and a connector 508. Connector 508 may comprise any suitable connector for communicating with a host system, such as a USB type of cable. A wireless module may also be present in the housing and may be coupled to PCB 507. The wireless module may comprise an antenna (not shown) which allows the input device 500 to communicate with a host system (not shown) using radio frequencies. Examples of wireless specifications for input device 500 may include but are not limited to Bluetooth wireless technology, 27 MHz, 2.4 GHz, and WiFi technologies. In certain embodiments, input device 500 may also have a compartment for a portable power supply, such as room for two or more AA type batteries.

Although optical sensor assemblies are described in detail, other types of sensor assemblies can be used. Optical assemblies can include few moving parts and are generally more reliable than purely mechanical systems. Further details regarding components that can be present in the optical assemblies are provided below.

As noted above, in certain embodiments one or more optical sensor assemblies sense the relative movement of the ball, such as when a user moves the ball. That is, light can be provided by a light source in an optical sensor assembly to the ball and the reflected image of the ball may be received by a sensor chip in the optical sensor assembly. Speckles or other material can be provided in the ball to make its movement easier to track. In one implementation, the ball may be a dark red color with metallic flecks disposed throughout. The ball may formed of any suitable material, such as resin, polyester, plastic, metal, etc. In certain embodiments, the ball does not have speckles or uniform markings. The optical sensor assemblies used in embodiments may comprise an optical assembly such as an ADNB-6532 sensor assembly and the ADNS-7550 sensor assembly, both of which are commercially available from Avago Technologies. Alternative sensor assemblies can be contemplated by one skilled in the art.

Figure 6:
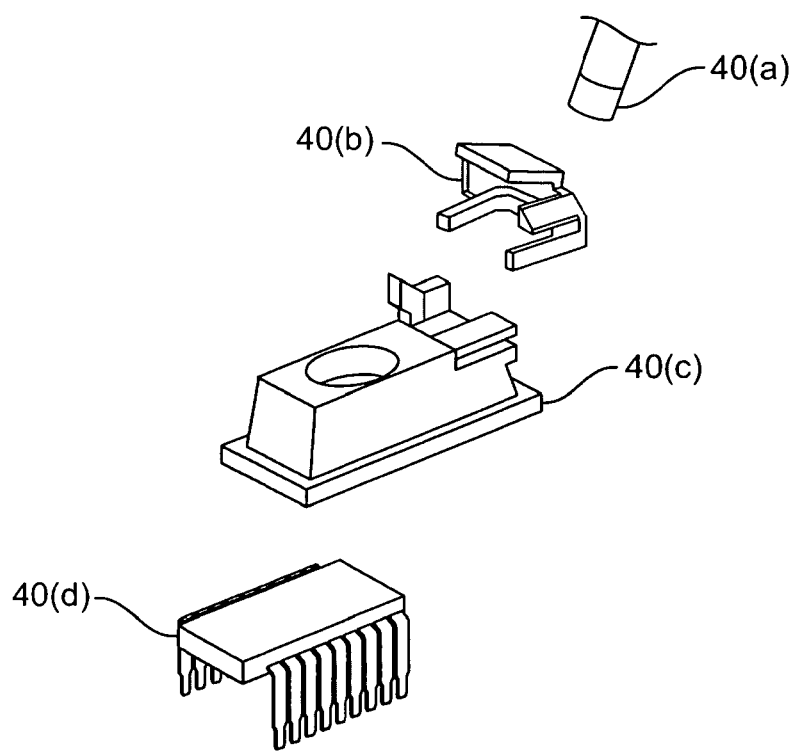
FIG. 6 shows an exploded view of some components of an exemplary sensor assembly.

FIG. 6 shows some components that may be in the optical sensor assemblies used in some embodiments of an input device. They include a light source 40a, a light holder 40b, a lens 40c, and a sensor 40d. The laser source 40a may be a laser, LED, or other suitable light source. These components may be physically coupled together. As noted above, such assemblies may be commercially obtained.

Figure 7B:
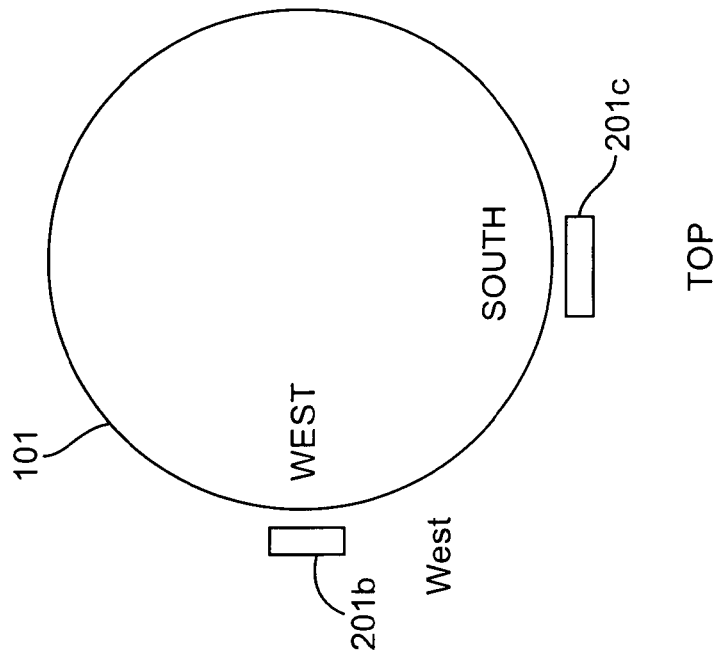
FIGS. 7A-7B show a side and top views of sensor positions in an embodiment of an input device.
Figure 7A:
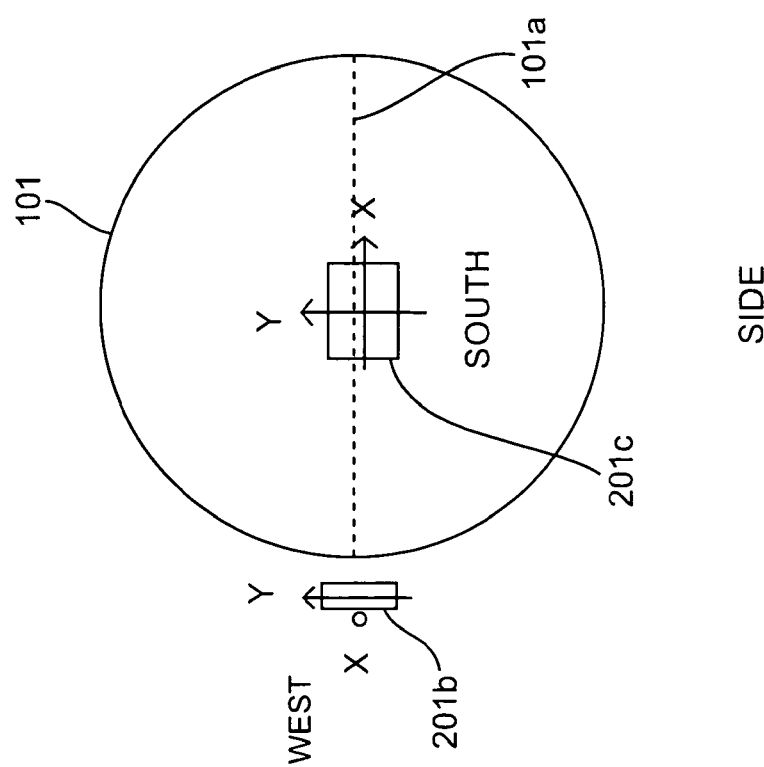

FIGS. 7A-7B show a side and top views of sensor positions, respectively, of an embodiment of an input device. In this embodiment, a west sensor assembly 201b and a south sensor assembly 201c are disposed around a ball 101. Thus, from the perspective of a user looking at the ball 101 from above, there may be a sensor on the left lateral side of ball 101 (sensor assembly 201b), and a sensor on the lower edge of ball 101 (sensor assembly 201c). From a side perspective, the sensor assemblies can be located approximately at or below the equator 101a of ball 101. Referring to FIG. 7A, sensor assembly 201b and can detect the motion of ball 101a in both an X-direction (parallel to equator 101a) and in an Y-direction (perpendicular to equator 101a). Sensor assembly 201c can likewise detect the motion of ball 101a in both an X-direction (parallel to equator 101a) and in an Y-direction (perpendicular to equator 101a). As described above, the equator may be approximately parallel to a work surface, such as approximately 10 degrees from parallel.

Figure 8B:
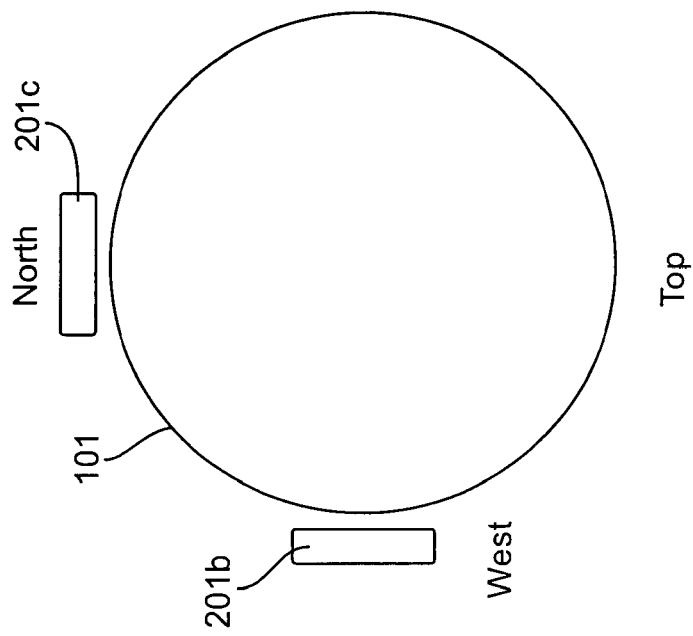
FIGS. 8A-8B show a side and top views of sensor positions in an embodiment of an input device.
Figure 8A:
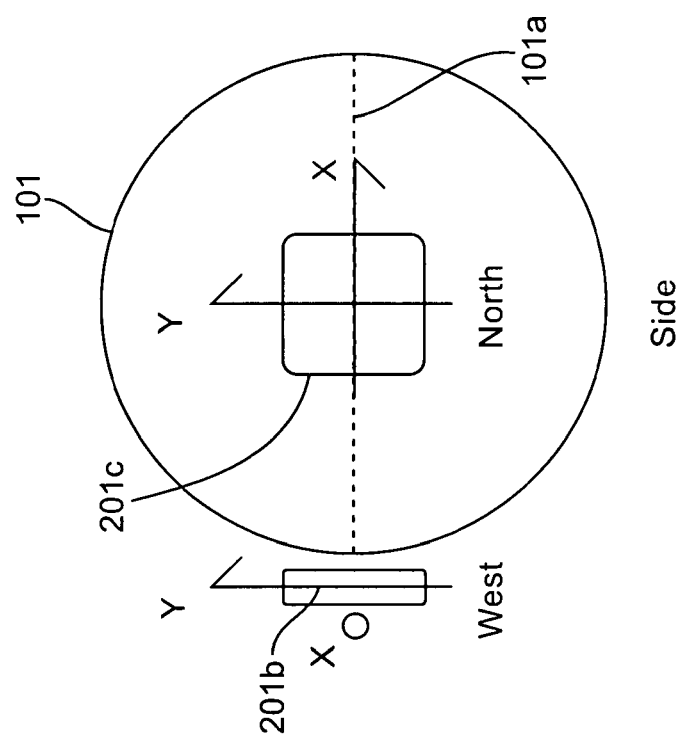

FIGS. 8A-8B depict another embodiment of sensor positions. In this embodiment, a west sensor assembly 201b and a north sensor assembly 201c are disposed around a ball 101. Thus, from the perspective of a user looking at the ball 101 from above, there may be a sensor on the left lateral side of ball 101 (sensor assembly 201b), and a sensor on the upper forward edge of ball 101 (sensor assembly 201c). These sensor assemblies 201b and 201c may also be located approximately at or below the equator 101a. In the implementation shown in FIG. 8A, the sensor assemblies 201b and 201c are located approximately at the equator, however embodiments described herein contemplate other locations. Embodiments of the input device may have alternative sensor positions, such as a south sensor and an east sensor, etc.

Figure 9:
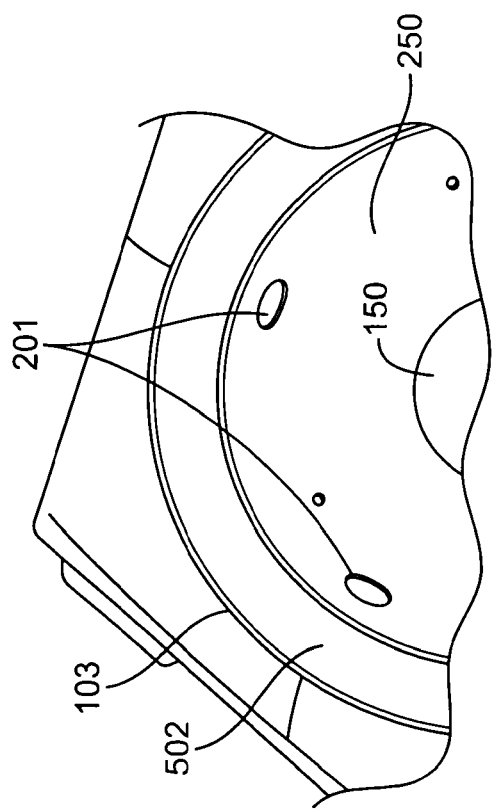
FIG. 9 shows a close up view of an embodiment of an input device.

FIG. 9 shows a corner of an input device 100 without a ball, according to an embodiment. Input device 100 has an aperture 250 in upper housing 103. A ball may normally reside within aperture 250 during use of the input device 100. Seen within aperture 250 are a plurality of sensor assemblies 201 and finger ring 502. In exemplary embodiments, the plurality of sensor assemblies 201 comprises two sensors assemblies that are spaced approximately 90 degrees apart and may be located approximately 17 degrees below the equator of a ball residing in aperture 250. A surface 150, such as a desk or table, is visible through aperture 250. Aperture 250 thus extends through the entire depth of input device 100. This allows input device 101 to have a lower profile, which can be more ergonomic for a user. This can reduce user fatigue and help prevent repetitive motion injuries.

Figure 10:
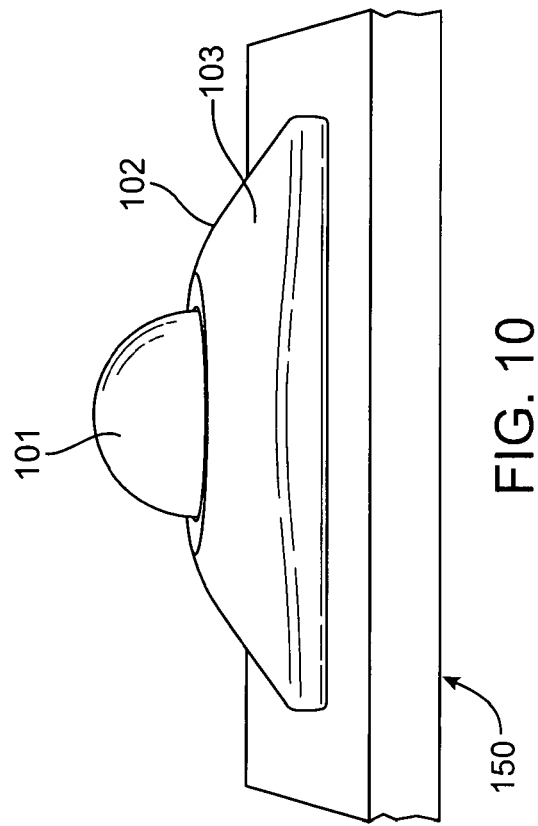
FIG. 10 shows a front view of an embodiment of an input device.

Referring to FIG. 10, a front view is provided of the input device shown in FIG. 10. In this embodiment, the input device is shown to have a low profile (i.e., the upper housing 103 remains close to surface 150). Furthermore, the location of sensor assemblies 201 at or below the equator allows a substantial portion of ball 101 to extend beyond the upper housing 103. In certain embodiments, at least half of the surface area of ball 101 may extend beyond upper housing 103. For example, 60 percent of the surface area of ball 101 may extend beyond upper housing 103. Having a substantial portion of ball 101 so extend allows a user to have greater control and easier access to ball 101, enhancing the user experience.

Figure 11:
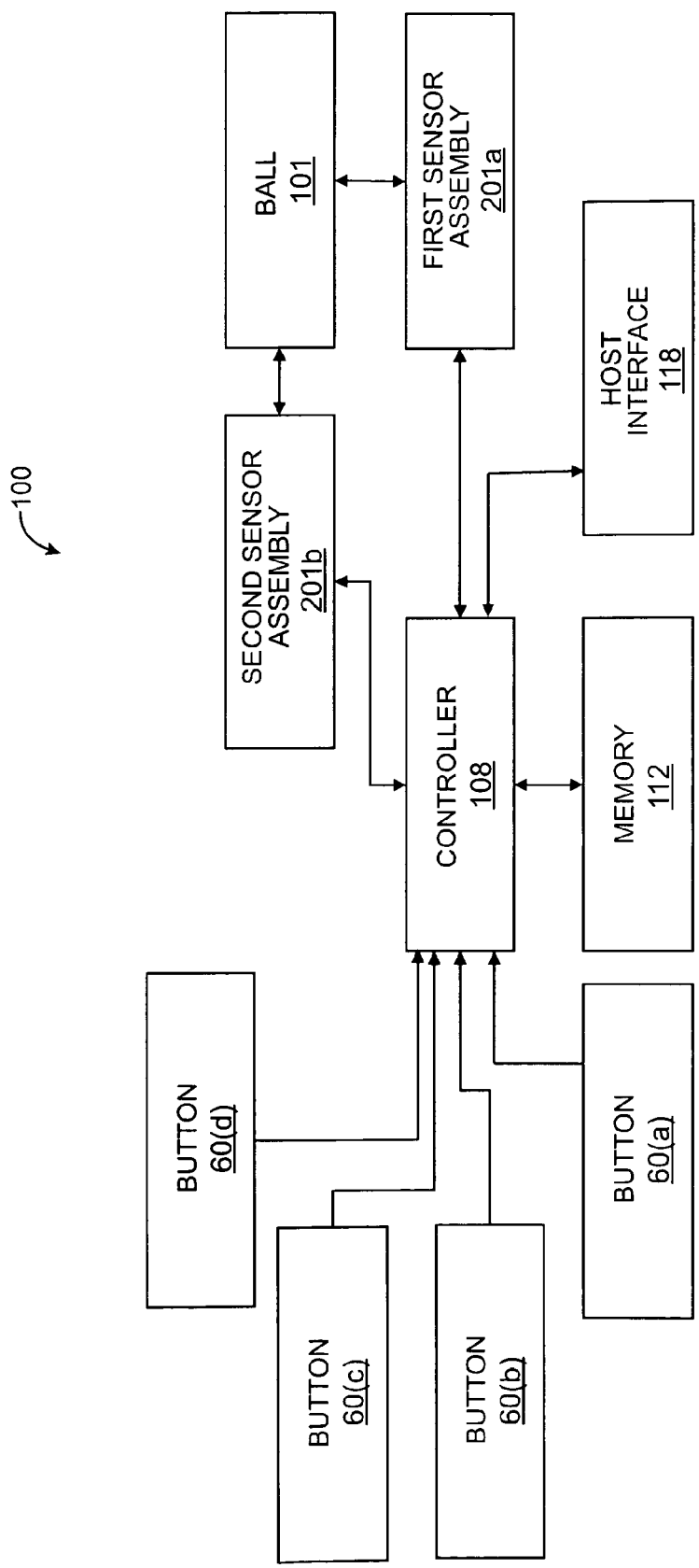
FIG. 11 shows a block diagram of some functional components in the input device.

FIG. 11 shows a block diagram of some components in the input device 100. The input device 100 may include a controller 108, which receives user input from buttons 60(a), 60(b), 60(c), and 60(d). As noted above, the buttons may have various functions, and such functions may change depending on the state of the input device 100. For example, in a first state, the input device can be used to control a cursor on a host system display screen, and buttons 60(a) and 60(b) may be used to select items on the host system display screen. In a second state, the input device can be used to control a media presentation, such as movie or a audio playback. In the second state, button 60(a) may be used to play or pause the media presentation, and button 60(b) may be used to stop the media presentation. In certain implementations, buttons 60(c) and 60(d) may be used to toggle the input device 100 between the various states.

The controller 108 may also communicate with the first and second optical sensor assemblies 201a, 201b. As noted above, the optical sensory assemblies 201a, 201b can determine both the X-Y motion and the spin of ball 101.

The controller 108 may also be electrically coupled to a memory 112, and a host interface 118.

The controller 108 may comprise processor and may be configured to control the operation of the input device 100 by executing code in the memory 112. The controller 108 may be embodied by any suitable combination of hardware and software.

The memory 112 may comprise one or more volatile or non-volatile memory devices such as ROM, EEPROMs, etc. It may store code for performing any of the functions performed by the input device. The code may be stored on any suitable computer readable media. Examples of computer readable media include magnetic, electronic, or optical disks, tapes, sticks, chips, etc. The code may also be written in any suitable computer programming language including Assembly, C, C++, etc.

The memory 112 may comprise code for allowing the input device 100 to perform any of the functions described in this application. For example, the memory 112 may comprise code for determining spin of ball 101. It may also comprise code for allowing ball 101 to be used as a trackball based upon the X-Y motion of the ball.

The host interface 118 may be an interface which allows the input device to communicate with a host system such as computer system. Examples of host interfaces 118 include wireless modules (which may include an antenna for receiving or sending wireless signals to a corresponding antenna in a host system), input-output ports, connection cables, etc.

Although separate functional blocks are shown in FIG. 11, it is understood that one functional block may be embodied by two or more actual physical components, or two or more functional blocks may be embodied by a single physical component. For example, the controller 108 and the memory 112 may be integrated into one package or chip. In another example, the memory 112 may be embodied by two or more memory chips or the like.

Figure 12:
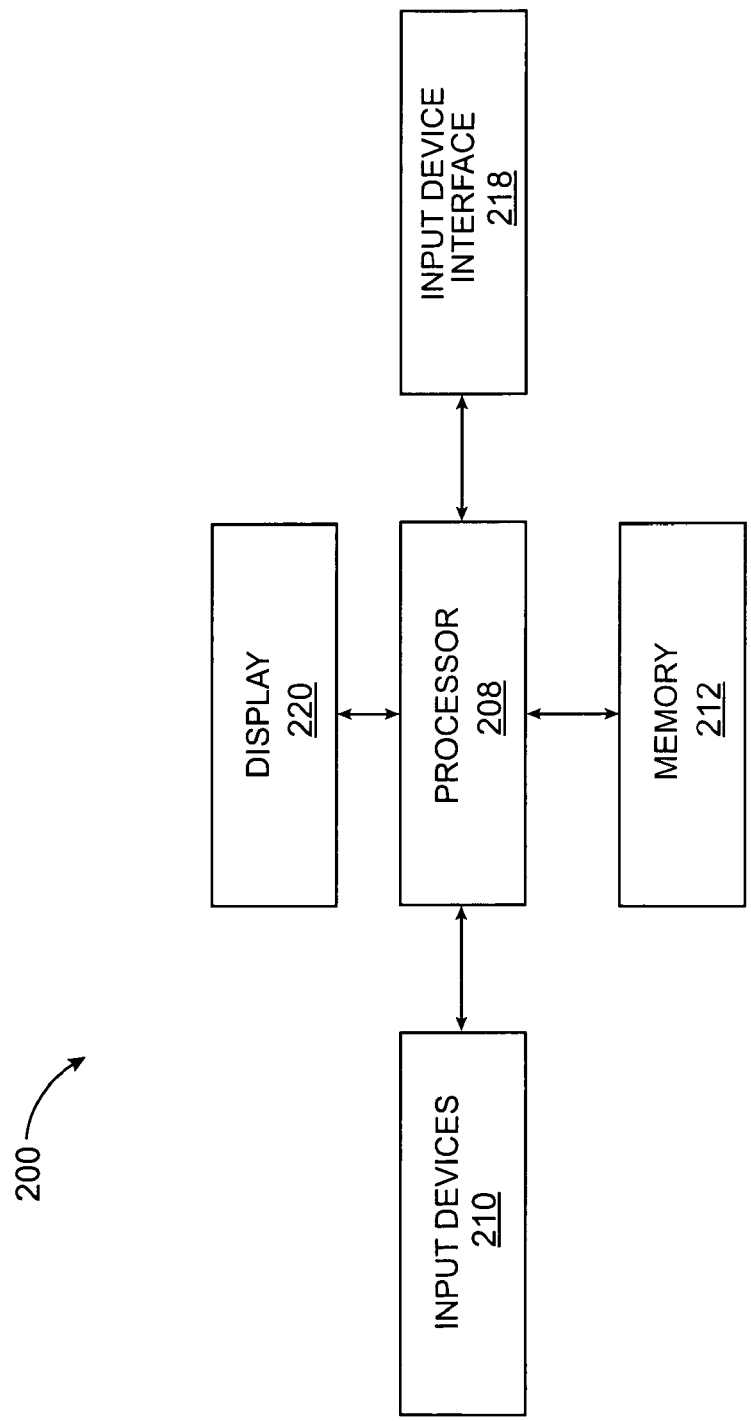
FIG. 12 shows a block diagram of some functional components in a host system, which can be used with an input device.

The input device 100 may be used with a host system such as a host computer device (e.g., a personal computer, a television, etc.). Referring to FIG. 12, the host interface 118 (of input device 100 described herein) may interface with an input device interface 218 in a host system 200. The input device interface 218 may be an interface which allows the host system 200 to communicate with the input device 100. For example, the input device interface 218 may comprise an antenna configured to receive RF signals from the host interface 118 of the input device 100. It may be embodied by a separate device such as a dongle or a wireless device inside of a host system. In another example, the input device interface 218 could be a port which is capable of interfacing with a wire that connects to the host interface 118.

As shown in FIG. 12, the host system 200 may comprise input devices (e.g., a keyboard, remote control, etc.) 210, a display screen 220, as well as a memory 212. In exemplary embodiments, one or more input devices 210 can correspond to alternative input devices from input device 100. This can allow for the simultaneous use of multiple input devices with a single host system 200. For example, a user may use both a keyboard 210 and an input device 100 in controlling a host system 200. Control signals sent by input device 100 may result in different images being shown on display screen 220. The result on the display screen 220 may depend on the type of control signal. For example, an X-Y motion of the ball may produce a first type of result, such as movement of a cursor. A spin of the ball my produce a second type of result, such as scrolling of a window. A central processor 208 may be operatively coupled to the input devices 210, display screen 220, and memory 212. The host system may be a standard computer system such as a laptop computer system, a desktop computer system, a handheld computer system (PDA), a game console, or even a television. The memory 212 may comprise appropriate driver software to allow the input device to work with the host system.

The memory 112 can contain code (i.e., firmware), executed by the controller 108, to determine the motion of the ball 101 and send control signals to host system 200. In certain implementations, memory 112 may have code for button state monitoring, cursor motion update, scroll motion update, etc.

The memory 112 can contain code instructing sensor assemblies to sense the position of the ball and provide the position as data to the controller. The memory 112 can also contain code instructing the controller 108 to analyze the data from the sensor assemblies 201a and 201b at predetermined intervals, such as every 2 milliseconds (ms) or every 10 ms. In certain embodiments, the input device 100 may connect to a host system using a USB connection which can report every 10 ms. Thus, in certain embodiments, the input device 100 may analyze the readings from the sensor assemblies 201a, 201b at least five times per USB report. In certain implementations, each time the controller 108 analyzes the data from the sensor assemblies, the controller 108 can make a determination of either an X-Y motion of the ball 101, or a spin of the ball 101. In exemplary embodiments, if the controller 108 determines spin of the ball 101, the controller 108 (and thus the input device 100) can be set to a first mode (e.g., a spin mode). The controller 108 may set a "flag", such as a spin detection flag or other signal, to indicate that the controller 108 comprises the first mode. In certain embodiments, if the controller 108 determines X-Y motion of the ball, the controller 108 can be set to a second mode (e.g., an X-Y mode or cursor mode). The controller may set a flag, such as an X-Y motion flag or other signal, to indicate that the controller comprises the second mode. In certain embodiments, the controller 108 may comprise the second mode as long as spin of the ball 101 is not detected. In these embodiments, no flag may be set to indicate the second mode. The controller 108 may maintain its current mode until the next time it analyzes the data from the sensor assemblies (e.g., the current mode may be maintained for 2 ms, 10 ms, etc.).

Figure 13:
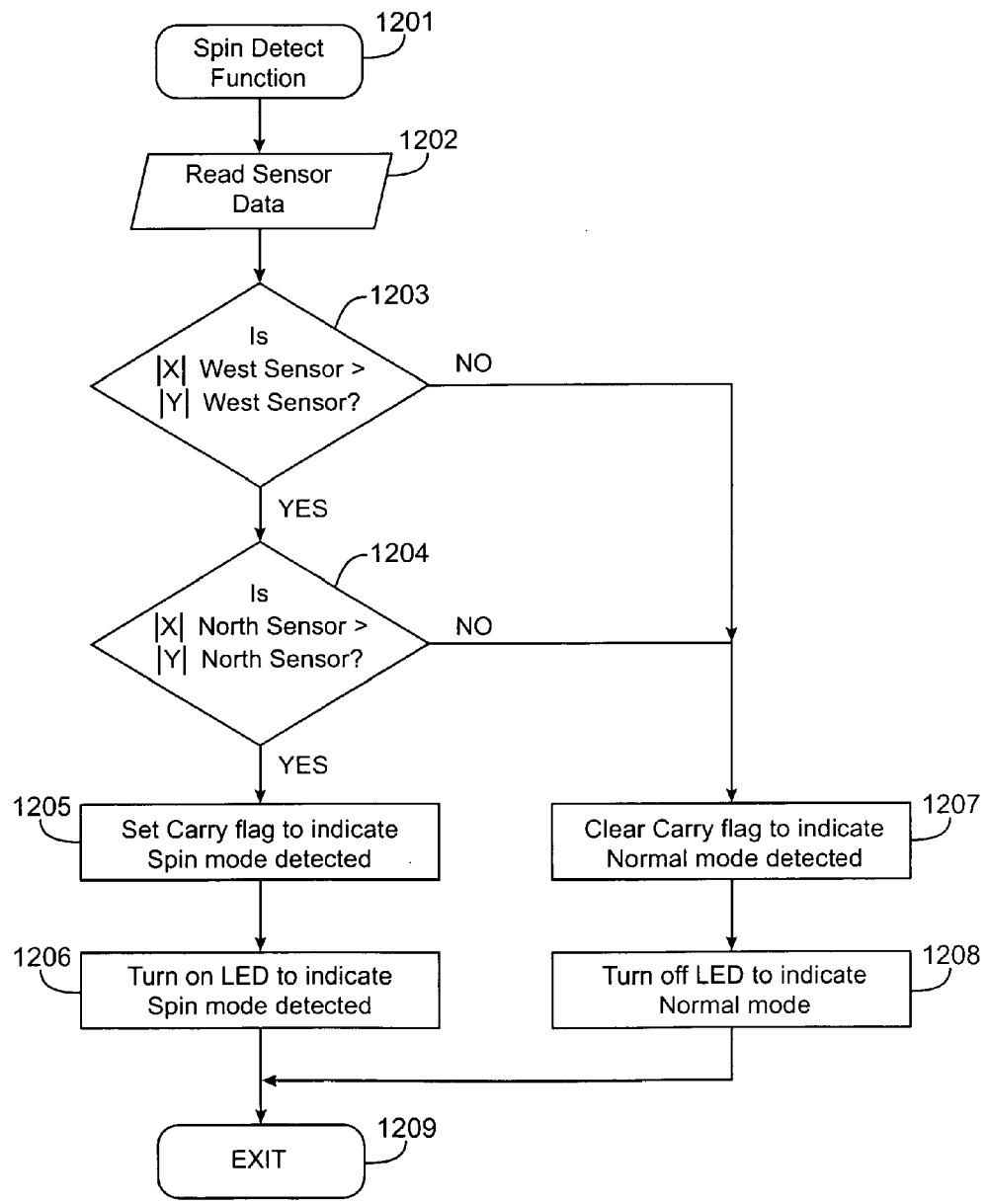
FIG. 13 shows a flowchart of a method performed by an embodiment of an input device.

As described above, spin and X-Y motion can comprise different types of movement of ball 101. In certain implementations, the motion of the ball may comprise either spin or X-Y motion. That is, in these implementations, if there is spin then there is no X-Y motion; if there is X-Y motion then there is no spin. One method of determining spin of a ball is shown in the flowchart of FIG. 13. In the method of FIG. 13, a controller is operatively coupled to two sensor assemblies.

Each sensor assembly can determine ball movement in both an X-direction and a Y-direction, as described above. In the method shown in FIG. 13, the controller is set to a first mode (e.g., spin mode) when both sensor assemblies detect spin, and the controller is set to a second mode (e.g., normal mode or X-Y mode) when one or both of the sensor assemblies do not detect spin. A spin detection flag may be set by the controller to indicate the first mode and no flag may set when the controller comprises the second mode. A memory may contain code, executed by the controller, for performing the steps in FIG. 13.

Referring to FIG. 13, a spin detect function may be started in step 1201. As described above, a controller in an input device may call the spin detect function at predetermined intervals, such as every 2 ms. In step 1202, the controller can read the data from the sensor assemblies, to determine the motion of the ball. The controller may analyze the data from a first sensor assembly (e.g. a west sensor) in step 1203 to see if the first sensor assembly detects spin of the ball. In the embodiment of step 1203, if the first sensor assembly does not determine greater movement of the ball in the X-direction than in the Y-direction, then the first sensor assembly does not detect spin. Thus the controller will be set to the second mode, for X-Y motion. If there is a spin flag set, it will be cleared in step 1207, and any spin indicator lights can be turned off in step 1208.

If the first sensor assembly determines that there is greater ball movement in the X-direction than the Y-direction, then the first sensor assembly may detect spin. The controller can next (or concurrently with step 1203) analyze the data from the second sensor assembly (e.g. a north sensor) in step 1204. If the second sensor assembly does not determine greater movement of the ball in the X-direction than in the Y-direction, then the second sensor assembly does not detect spin. The controller can therefore be set to the second mode, for X-Y motion. If there is a spin flag set, it can be cleared in step 1207, and any spin indicator lights can be turned off in step 1208. If the second sensor assembly determines that there is greater ball movement in the X-direction than the Y-direction, then the second sensor assembly may detect spin. When both the first sensor assembly and the second sensor assembly detect spin, the controller can be set to the first mode, for spin. A spin flag may be set in step 1205, to signify the first mode, and a light emitting diode (LED) or other indicator may be turned on, to alert a user. The controller can then exit the spin detect function in 1209, or it may return to step 1201 to again determine spin of the ball. In certain embodiments, the controller may wait a predetermined time (such as 2 ms) between exiting the spin detect function 1209 and starting the spin detect function 1201. In some embodiments, the spin detect function may be called upon motion being sensed by one or more of the sensor assemblies. An example of FIG. 13 implemented in code is shown in Table 1:

TABLE 1

| SPIN DETERMINATION: | |
|---|---|
| mov A, [west_x] | setup for compare of |
| Mov [a_lo], A | |X| and |Y| for West sensor |
| mov A, [west_y] | |
| mov [b_lo], A | |
| call COMPARE_AV | now compare |
| jnc NOT_SPIN | carry set if |X| > |Y| (possible spin!) |
| mov A, [north_x] | now setup for compare of |
| mov [a_lo], A | |X| and |Y| for North sensor |
| mov A, [north_y] | |
| mov [b_lo], A | |

TABLE 1-continued

| | |
|---|---|
| call COMPARE_AV | now compare |
| jnc NOT_SPIN | carry set if \|X\| > \|Y\| (possible spin!) |
| LED_ON | Macro: turn on LED to indicate spin mode detected |
| SETC | set carry flag |
| jmp EXIT_SPIN | |
| | NOT SPIN: |
| LED_OFF | Macro: turn off LED to indicate normal mode detected |
| CLRC | clear carry flag |
| | EXIT SPIN: |
| ret | |

When the controller is in the first mode (spin mode), the sensor assemblies can detect the rate and direction of rotation of the ball, and the controller can analyze the information to send appropriate control signals to a host system. For example, a user may rotate the ball of the input device to scroll up and down in a window displayed on the host system. The direction of the rotation (e.g., clockwise/counterclockwise) can determine the direction of the scroll (e.g., down or up), and the speed of the rotation can determine the speed of the scrolling. In another aspect, the direction of the rotation of the ball may determine the zoom in or out of a picture, with the speed of rotation corresponding to the rate of the zoom.

When the controller is in the second mode (X-Y mode), the sensor assemblies can also determine the rate and direction of the movement of the ball, and the controller can analyze the information to send appropriate control signals to the host system. The control signals can vary, however, from the control signals sent in the first mode. For example, in the second mode, the motion of the ball can correspond to the motion of a cursor on a display screen of the host, as is known in the art.

Referring to FIGS. 11 and 12, a method for using the above-described input device 100 can include manipulating the ball 101 by rotating it to send a control signal to the host system using the sensor assemblies 201a, 201b, controller 108 and host interface 118. The user can move the ball in a first rotation, which will send a first type of control signal. For example, the control signal may control a cursor in the X-Y direction on a display screen 220 in the host system 200 upon X-Y motion of the ball. If the user wants to activate a function controlled by the spin of ball 101, the user can rotate the ball in a second rotation, in either clockwise or counter-clockwise rotation. Controller 108 can recognize the spin of the ball using sensor assemblies 201a and 201b, and can send a second type of control signal (i.e. a spin command) to host system 200 through host interface 118.

Figure 14:
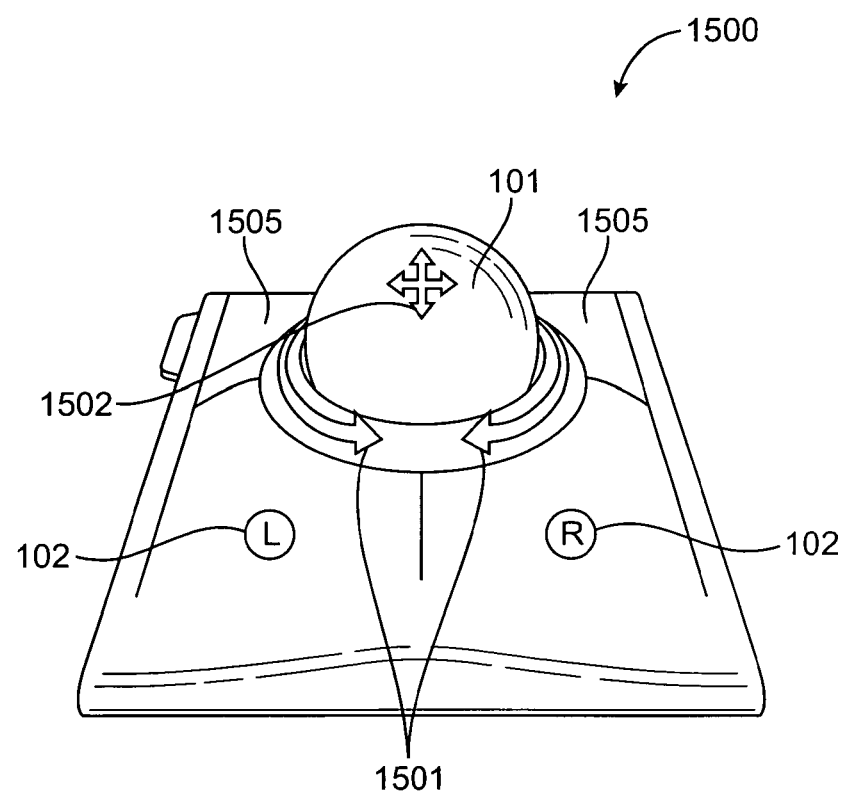
FIG. 14 shows a perspective view of an embodiment of input device.

FIG. 14 depicts an embodiment of an input device 1500 in use. FIG. 14 shows arrows highlighting the movement of a ball 101 for spin 1501, and X-Y motion 1502. In exemplary embodiments, the input device 1500 may have multiple states. In a first state, a spin 1501 of the ball 101 can be used to scroll a window on a display screen of a host system, and X-Y motion 1502 of the ball 101 can be used to control a cursor on the display screen. In a second state, spin 1501 of the ball can be used to control the volume of media files being played on the host system, and X-Y motion 1502 can be used to change which media files are being played. In a third state, X-Y motion 1502 of the ball 101 can be used to pan and spin an image on the display screen, and spin 1501 of the ball 101 can be used to zoom in and out of the image. In certain embodiments, buttons 1505 may toggle between the various states, and buttons 102 may be used for other control functions, such as selecting or entering information. Other functions can be controlled by the X-Y motion 1502 and spin 1501 of the ball 101. For example, the input device may be used with Computer Assisted Design (CAD) programs. In these implementations, X-Y motion 1502 may be used to control Pitch and Roll of a displayed object, or the X and Y position of the object. Spin 1501 may be used to control yaw of the object, or the Z position of the object.

The above-described input device can be made using any suitable method. In one embodiment, the method comprises providing a housing comprising an upper portion and a lower portion, providing a ball at the upper portion of the housing, and providing one or more sensor assemblies configured to sense both the X-Y motion and the spin of the ball. In particular, the components shown in FIGS. 4 and 5 can be assembled together in any suitable order to create the input device.

Embodiments of the devices, systems, and methods disclosed herein contain a number of advantages. Embodiments of the input device include a controller that can determine both spin and X-Y motion of a ball. This can allow for a greater variety of control functions from a single input device. Using spin of the ball to control certain functions of a host system can make it easier for the user, who does not need to memorize extra button combinations or other types of control systems. Furthermore, assigning two different functions to two different types of ball movement (spin and X-Y motion) is an intuitive and ergonomic way to input controls to a host system. In certain embodiments, the input device may have one or more sensor assemblies located at or near the equator of the ball. This can reduce the overall height of the device, allowing the bottom of the ball to be located closer to a work surface. Furthermore, by placing the one or more sensor assemblies below the equator of the ball, a larger proportion of the surface area of the ball can be exposed to a user. These features can allow for a more comfortable user experience, reducing fatigue and potential medical consequences.

The terms and expressions which have been employed herein are used as terms of description and not of limitation, and there is no intention in the use of such terms and expressions of excluding equivalents of the features shown and described, it being recognized that various modifications are possible within the scope of the invention claimed. Specific ranges, proportions, and figures cited above may be adjusted without undue experimentation, and such adjustments are contemplated by embodiments described herein. Moreover, one or more features of one or more embodiments of the invention may be combined with one or more features of other embodiments of the invention without departing from the scope of the invention. While the present invention has been particularly described with respect to the illustrated embodiments, it will be appreciated that various alterations, modifications, adaptations, and equivalent arrangements may be made based on the present disclosure, and are intended to be within the scope of the invention and the appended claims.

Any recitation of "a", "an" and "the" is interpreted to mean "one or more" unless specifically indicated to the contrary.

What is claimed is:
1. An input device comprising:
a ball;
a sensor assembly configured to sense the position of the ball; and
a controller operatively coupled with the sensor assembly, wherein the controller is configured to determine both an X-Y motion of the ball and a spin of the ball, wherein the controller is set to a spin mode when the sensor assembly detects spin of the ball, and wherein the controller is set to an X-Y mode when the sensor assembly does not detect spin of the ball.

2. The input device of claim 1, wherein the ball comprises a diameter approximately parallel to a work surface, and further wherein the spin of the ball comprises a rotation of the ball about the diameter.

3. The input device of claim 2, wherein the spin of the ball comprises either a clockwise or a counter-clockwise rotation of the ball about the diameter.

4. The input device of claim 1, wherein the ball comprises a vertical axis, and further wherein the controller determines spin of the ball upon a rotation of the ball about the vertical axis.

5. The input device of claim 1, further comprising a host interface, wherein the host interface is configured to emit a first control signal to a host system when the controller is set to the spin mode, and further wherein the host interface is configured to emit a second control signal to the host system when the controller is set to the X-Y mode.

6. The input device of claim 1 wherein the sensor assembly is a first sensor assembly, the input device further comprising:
a second sensor assembly operatively coupled to the controller and configured to sense the position of the ball, wherein the controller determines the spin of the ball using both the first sensor assembly and the second sensor assembly.

7. The input device of claim 6, wherein the first sensor assembly and the second sensor assembly are located approximately 90 degrees apart from each other.

8. The input device of claim 6, wherein the first sensor assembly is a first optical sensor assembly and the second sensor assembly is a second optical sensor assembly.

9. The input device of claim 6, wherein the ball comprises a diameter approximately parallel to a work surface, and further wherein the first sensor assembly and the second sensor assembly are located approximately at or below the diameter of the ball.

10. A system comprising:
an input device comprising:
a ball;
a sensor assembly configured to sense the position of the ball; and
a controller operatively coupled with the sensor assembly, wherein the controller is configured to determine both an X-Y motion of the ball and a spin of the ball, wherein the controller is set to a spin mode when the sensor assembly detects spin of the ball, and wherein the controller is set to an X-Y mode when the sensor assembly does not detect spin of the ball; and
a display screen connected to the input device, wherein the X-Y motion of the ball produces a first type of result on the display screen, and wherein the spin of the ball produces a second type of result on the display screen.

11. The system of claim 10 wherein the first type of result comprises movement of a cursor and the second type of result comprises a scrolling of a window in the display screen.

12. An input device for providing a control signal to a host system, the input device comprising:
a ball;
a first sensor assembly configured to sense the position of the ball;
a second sensor assembly configured to sense the position of the ball; and
a controller operatively coupled with the first sensor assembly and the second sensor assembly, wherein the controller is set to a spin mode when both the first sensor assembly and the second sensor assembly detect spin, and the controller is set to an X-Y mode when at least one of the first sensor assembly and the second sensor assembly do not detect spin.

13. The input device of claim 12, wherein each of the first and second sensor assemblies can determine ball movement in an X direction and in a Y direction, further wherein the first sensor assembly detects spin upon determining that the ball movement in the X direction is greater than the ball movement in the Y direction, and the second sensor assembly detects spin upon determining that the ball movement in the X direction is greater than the ball movement in the Y direction.

14. The input device of claim 12, wherein the first sensor assembly is a first optical sensor assembly and the second sensor assembly is a second optical sensor assembly.

15. The input device of claim 12, further comprising a housing around the controller and the first and second sensors, wherein at least half of the surface of the ball extends above the housing.

16. A method of controlling a host system using an input device including a ball, the method comprising:
determining, by a controller, a spin of the ball sensed by a sensor assembly and sending a first type of control signal to the host system; and
determining, by the controller, the movement of the ball in an X-Y rotation such that the sensor assembly does not detect the spin of the ball and sending a second type of control signal to the host system.

17. The method of claim 16, wherein the ball comprises a diameter approximately parallel to a work surface, and further wherein the spin of the ball comprises a rotation of the ball about the diameter.

18. The method of claim 17, wherein the spin of the ball comprises a clockwise or counterclockwise rotation.

19. The method of claim 16, wherein the ball comprises an axis approximately perpendicular to a work surface, wherein the spin of the ball comprises a rotation of the ball about the axis such that the axis remains approximately perpendicular to the work surface.

20. The method of claim 19, wherein the X-Y rotation comprises a rotation of the ball such that axis does not remain approximately perpendicular to the work surface.

* * * * *

UNITED STATES PATENT AND TRADEMARK OFFICE
CERTIFICATE OF CORRECTION

PATENT NO. : 8,502,781 B2  
APPLICATION NO. : 12/922847  
DATED : August 6, 2013  
INVENTOR(S) : Cavacuiti et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this

Fifteenth Day of September, 2015

Michelle K. Lee
*Director of the United States Patent and Trademark Office*